(12) United States Patent
Fin

(10) Patent No.: US 10,898,026 B2
(45) Date of Patent: Jan. 26, 2021

(54) WATER CONTAINER AND A MACHINE FOR MAKING BEVERAGES COMPRISING SAID CONTAINER

(75) Inventor: Giuseppe Fin, Meolo (IT)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 455 days.

(21) Appl. No.: 13/814,004

(22) PCT Filed: Aug. 4, 2011

(86) PCT No.: PCT/IB2011/053479
§ 371 (c)(1),
(2), (4) Date: Feb. 4, 2013

(87) PCT Pub. No.: WO2012/020360
PCT Pub. Date: Feb. 16, 2012

(65) Prior Publication Data
US 2013/0139702 A1    Jun. 6, 2013

(30) Foreign Application Priority Data

Aug. 13, 2010 (EP) .................................. 10172726

(51) Int. Cl.
*A47J 31/46* (2006.01)
*A47J 31/60* (2006.01)

(52) U.S. Cl.
CPC ........... *A47J 31/461* (2018.08); *A47J 31/462* (2013.01); *A47J 31/605* (2013.01)

(58) Field of Classification Search
CPC .............................. A47J 31/46; A47J 31/462
USPC ......................................... 210/235; 137/594
See application file for complete search history.

(56) References Cited

U.S. PATENT DOCUMENTS

| | | | | |
|---|---|---|---|---|
| RE33,969 E | * | 6/1992 | Richter ................ | B67D 1/0078 137/594 |
| 5,256,285 A | * | 10/1993 | Tomita ................. | B01D 27/005 210/234 |
| 5,425,404 A | * | 6/1995 | Dyer ..................... | B67D 3/0012 141/21 |
| 5,603,352 A | * | 2/1997 | Tavor ...................... | F16K 1/126 137/594 |
| 5,700,371 A | * | 12/1997 | Koslow ................ | B01D 29/114 210/232 |

(Continued)

FOREIGN PATENT DOCUMENTS

| | | |
|---|---|---|
| CH | 587647 A5 | 5/1977 |
| CN | 200994708 Y | 12/2007 |

(Continued)

OTHER PUBLICATIONS

Office Action issued in connection with corresponding application No. 11754925.3 dated Mar. 24, 2014.

(Continued)

*Primary Examiner* — Ibrahime A Abraham
*Assistant Examiner* — John J Norton
(74) *Attorney, Agent, or Firm* — Schott, P.C.

(57) ABSTRACT

A water container for a beverage making machine includes side walls and a bottom, whereon there is a connecting union to the beverage making machine. The connecting union of the water container includes two apertures for water, where one aperture is an outlet aperture and the other aperture is an inlet aperture.

16 Claims, 4 Drawing Sheets

(56) References Cited

U.S. PATENT DOCUMENTS

| | | | | |
|---|---|---|---|---|
| 5,833,123 | A | * | 11/1998 | Gueret .................. B65D 47/263 222/153.06 |
| 5,914,037 | A | * | 6/1999 | Yen ...................... B01D 35/153 210/234 |
| 6,001,249 | A | * | 12/1999 | Bailey ..................... C02F 1/003 210/232 |
| 6,138,724 | A | * | 10/2000 | Rivera ..................... B67D 7/02 141/104 |
| 6,386,404 | B1 | * | 5/2002 | Auer .................. B65D 47/2068 222/212 |
| 7,347,137 | B2 | | 3/2008 | Lafond |
| 7,442,301 | B2 | * | 10/2008 | Huda ..................... B01D 35/30 210/232 |
| 8,025,708 | B2 | * | 9/2011 | Heikamp ............. B01D 46/003 55/498 |
| 8,202,419 | B2 | | 6/2012 | Wallerstorfer |
| 2004/0244599 | A1 | * | 12/2004 | Wei ................................. 99/279 |
| 2005/0115412 | A1 | * | 6/2005 | Kwon et al. .................... 99/279 |
| 2005/0247204 | A1 | * | 11/2005 | Lafond et al. .................. 99/279 |
| 2006/0000754 | A1 | * | 1/2006 | Kang .................. B01D 35/153 210/97 |
| 2009/0283467 | A1 | * | 11/2009 | Wallerstorfer ........ A47J 31/605 210/233 |
| 2010/0043647 | A1 | * | 2/2010 | Carbonini ....................... 99/300 |
| 2010/0107887 | A1 | * | 5/2010 | Bentley .................. A47J 31/44 99/288 |
| 2010/0170841 | A1 | * | 7/2010 | An ...................... B01D 35/147 210/234 |

FOREIGN PATENT DOCUMENTS

| | | |
|---|---|---|
| CN | 101530290 A | 9/2009 |
| CN | 101594922 A | 12/2009 |
| CN | 201360932 Y | 12/2009 |
| CN | 101721137 A | 6/2010 |
| DE | 7532789 U | 2/1976 |
| DE | 3904377 A1 | 8/1990 |
| DE | 102007038028 A1 | 4/2008 |
| FR | 2316901 A1 * | 2/1977 |
| FR | 2841116 A1 | 12/2003 |
| JP | 0385116 A | 4/1991 |
| JP | 2010500162 A | 1/2010 |
| RU | 2233607 C2 | 8/2004 |
| RU | 2361499 C2 | 7/2009 |
| WO | 2008017509 A2 | 2/2008 |
| WO | 2010043952 A1 | 4/2010 |

OTHER PUBLICATIONS

Office Action issued in connection with corresponding application No. 2011288147 dated Oct. 20, 2014.

Machine translation and First Office Action issued in connection with corresponding application No. 201180039389.5 dated Dec. 15, 2014.

Machine translation and Notification of Reasons for Refusal issued in connection with corresponding application No. 2013-523689 dated Aug. 20, 2015.

Machine translation and Second Office Action issued in connection with corresponding application No. 201180039389.5 dated Aug. 26, 2015.

Office Action issued in connection with corresponding application No. 2011288147 dated Nov. 24, 2015.

Machine translation and Third Office Action issued in connection with corresponding application No. 201180039389.5 dated Mar. 2, 2016.

Office Action issued in connection with corresponding application No. 2011288147 dated Jul. 5, 2016.

Machine translation and Decision of Refusal issued in connection with corresponding application No. 2013-523689 dated Jul. 12, 2016.

Machine translation and Fourth Office Action issued in connection with corresponding application No. 201180039389.5 dated Jul. 14, 2016.

Office Action issued in connection with corresponding application No. 11754925.3 dated Nov. 24, 2016.

Machine translation and Fifth Office Action issued in connection with corresponding application No. 201180039389.5 dated Oct. 26, 2017.

First Examination Report issued in connection with corresponding application No. 1311/CHENP/2013 dated Jan. 4, 2019.

Office Action issued in connection with corresponding application No. 2013/001654 dated Apr. 20, 2015, 4 pages.

Office Action issued in connection with corresponding application No. 2013110836 dated May 19, 2015, 4 pages.

Notice of Allowance issued in connection with corresponding application No. 2013110836 dated Dec. 7, 2015, 10 pages.

Notice of Allowance issued in connection with corresponding application No. 2013-523689 dated Nov. 18, 2016, 5 pages.

* cited by examiner

WATER CONTAINER AND A MACHINE FOR MAKING BEVERAGES COMPRISING SAID CONTAINER

TECHNICAL FIELD

The present invention relates to machines for making beverages, in particular but not exclusively electrical coffee machines. In particular, although not exclusively, the invention relates to coffee machines for household purpose. More in particular, the invention relates to improvements to tanks or containers for the feeding water of the infusion unit of these machines.

PRIOR ART

There are several types of coffee machines for household purpose, both manual and automatic or semi-automatic, comprising an infusion unit with an infusion chamber wherein a coffee charge is inserted, consisting of powder obtained from the grinding of coffee grains contained in a machine tank, or packaged in capsules or pods. Hot water coming from a container onboard of the machine is fed into the infusion chamber. The hot water crosses the coffee powder and extracts the flavours therefrom for producing a coffee drink that is dispensed from a dispensing spout or from a pair of dispensing spouts the machine is provided with. Hot water is fed to the infusion unit through a pump that sucks the water from the container. The water dispensed by the pump flows through a boiler and is brought to the temperature required for the infusion. When the hydraulic circuit the pump is inserted in is empty, the pump must prime. In the priming step, air first and then a mixture of air and water are sucked in until the entire hydraulic circuit is full. In the pump priming step, the water and air mixture coming out of the pump is discharged into a collecting tank the machine is provided with, to prevent feeding air bubbles into the boiler and in the infusion unit.

Discharging water into the collecting tank is a drawback since this tank, which also collects the water discharged in the unit washing and heating cycles, has a capacity that is necessarily moderate to be seated into the machine that has limited dimensions. The user must therefore empty the collecting tank quite often, for example every 10-15 infusion cycles. If water is discharged into the collecting tank also in the pump priming step, this implies an increase in the water volume collected in the tank and therefore a need of emptying the tank more frequently.

A seat for a filter is normally provided into the water container, wherethrough water sucked by the pump passes before exiting the container. The filter serves for removing calcium salts and thus reducing scale build-up into the boiler. This filter imposes some constraints in the container design.

SUMMARY OF THE INVENTION

According to one aspect, the invention aims at providing a water container for coffee machines that overcomes, entirely or in part, one of the drawbacks of the known containers. The object of a preferred embodiment of the invention is the realization of a container that allows recirculating the water into the same container during the pump self-priming step, with a configuration of the container that makes the use thereof simple and safe, in particular also in combination with water filters.

Substantially, in advantageous embodiments the invention provides for a water container for coffee machines or other machines for making beverages, which has side walls and a bottom, whereon there is a connecting union to the machine, wherein said union comprises two apertures for the water, respectively an outlet aperture and an inlet aperture.

In some advantageous embodiments, the union comprises a wall protruding from the bottom outwards of the container and surrounding the two water apertures. The wall may have a substantially annular development, for example cylindrical, not necessarily with a circular section.

In some embodiments, the outlet aperture and the inlet aperture comprise a first valve and a second closing valve, respectively. The valves are arranged and designed for opening when the container is interfaced, that is, connected to the machine.

Preferably, the container comprises a collar protruding from the bottom inwards of the container, surrounding the water outlet aperture and forming a seat for a water filter. Advantageously, in preferred embodiments of the invention, the inlet aperture is in communication with the container outside said collar. That is, the inlet aperture is outside the collar, next to it.

Further advantageous features and embodiments of the container according to the invention are indicated in the claims that are an integral part of the present description, and in the following description of a possible non-limiting embodiment of the invention.

According to another aspect, the invention provides a coffee machine, or more in general a machine for making beverages, comprising a water container or tank as defined above and a hydraulic circuit connectable by the outlet aperture and the inlet aperture within the container.

Further features of the coffee machine according to the invention are described hereunder with reference to an example of embodiment and in the appended claims, which form an integral part of the present description.

BRIEF DESCRIPTION OF THE DRAWINGS

The invention will be better understood by following the description and accompanying drawing, which shows a non-limiting practical embodiment of the invention. More in particular, in the drawing.

DETAILED DESCRIPTION OF AN EMBODIMENT OF THE INVENTION

In the following description, reference is specifically made to a machine for making coffee, but it is to be understood that the invention may be applied to any machine for making beverages wherein problems similar to those discussed in the present description may arise.

Figure 1:
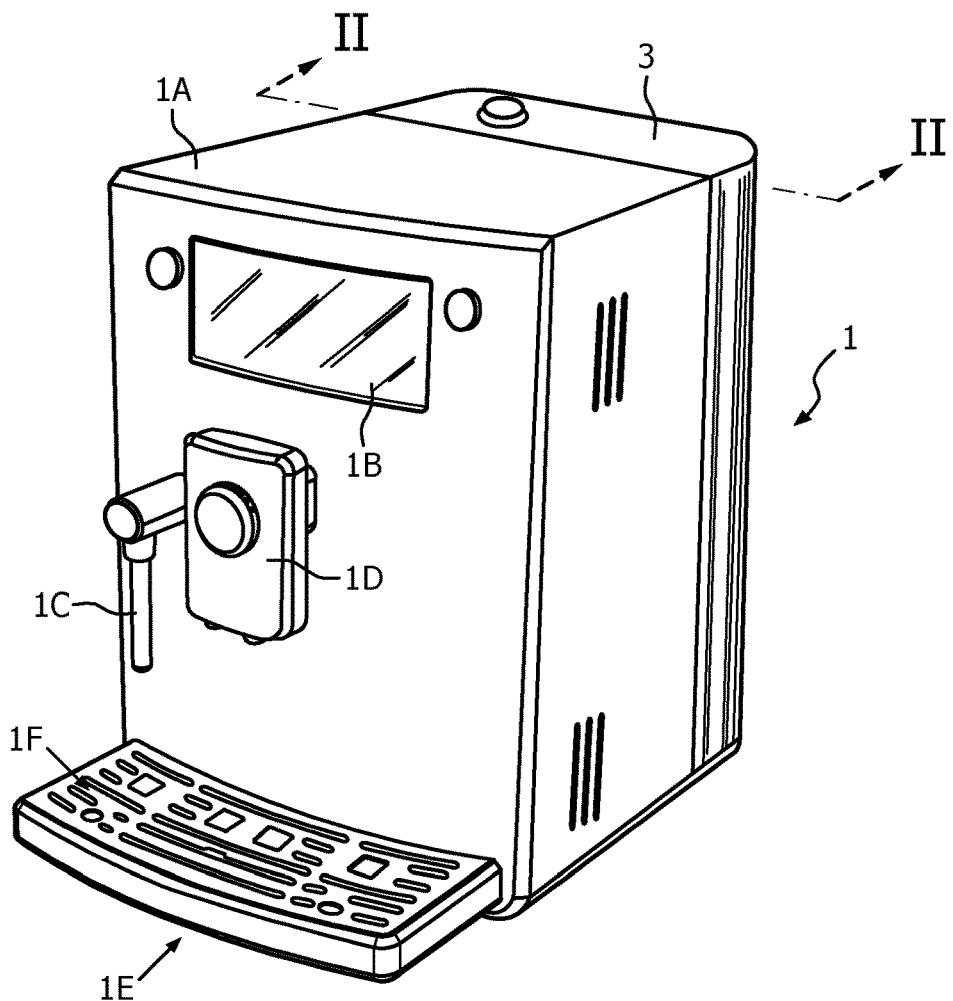
FIG. 1 shows a perspective schematic view of a coffee machine wherein a water tank or container according to the invention may be used.

FIG. 1 schematically illustrates an electrical coffee machine 1 wherein a water container 3 is provided. The machine comprises a series of elements that are not a part of the present invention and that shall not be described in particular detail herein. In general, the machine has a body 1A on the front part whereof there is provided an interface 1B for allowing the user to set the operations and impart the commands to machine 1, a spout 1C for dispensing steam or hot water and a dispensing unit 1D for dispensing coffee. The dispensing unit 1D is arranged on a support surface 1E whereon the cups or other containers are placed for coffee dispensing. Surface 1E may be provided with a grid 1F that closes an underlying waste collecting tank.

Figure 2:
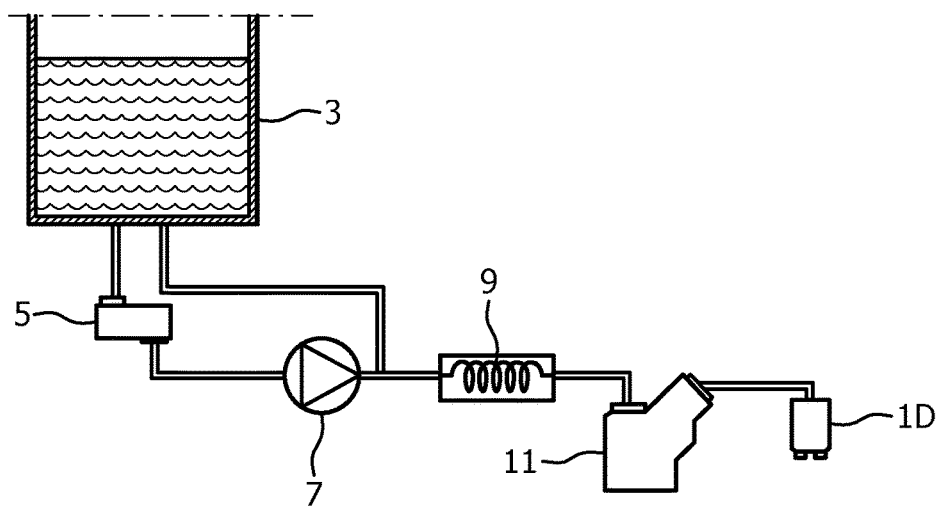
FIG. 2 shows a simplified diagram of the hydraulic circuit of the coffee machine.

FIG. 2 schematically shows, for the main components thereof only, the hydraulic circuit that takes water from container 3 and feeds it through a flow meter 5 by means of a pump 7 to a boiler 9. From the boiler, the hot water under pressure dispensed by pump 7 is fed to an infusion unit 11, the outlet whereof is connected to dispenser 1D. Components 5-11 are known per se and will not be described in detail herein.

Figure 4:
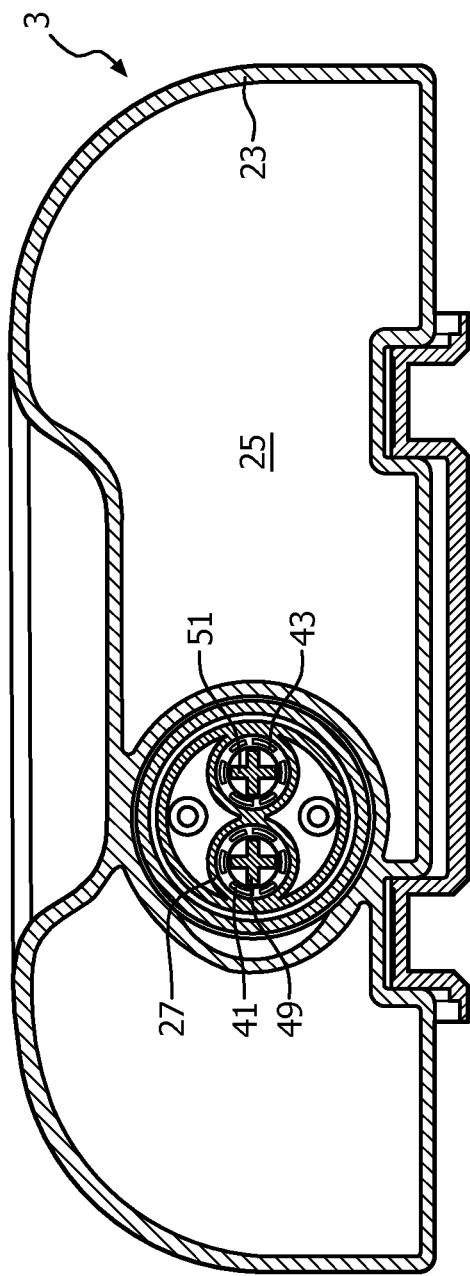
FIGS. 4 and 5 show sections according to horizontal trace planes respectively IV-IV and V-V of FIG. 3.
Figure 5:
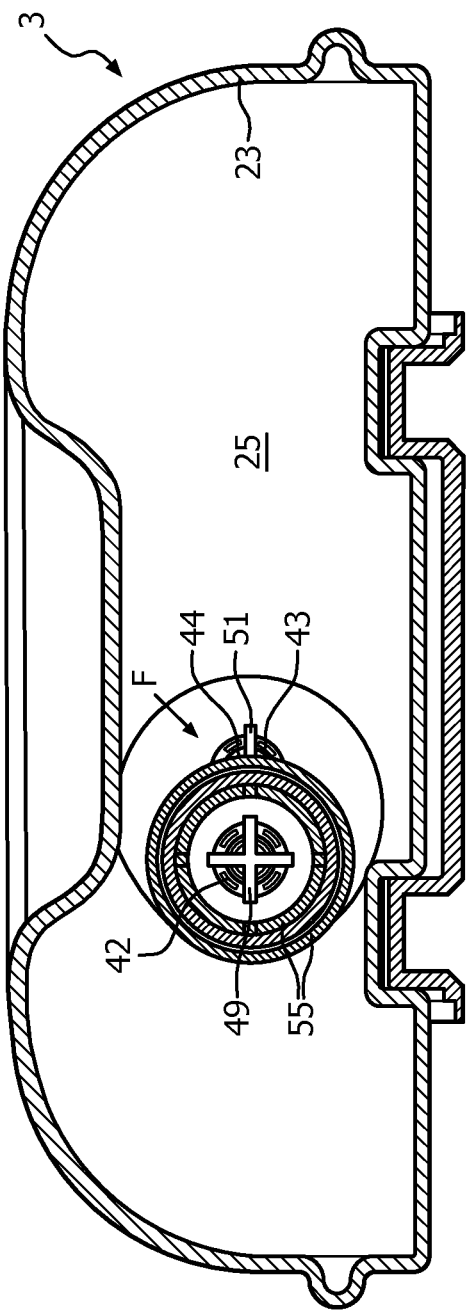

The overall configuration of machine 1 may be whatever and the one shown is exemplary only. In particular, the water tank or container 3 may be arranged in a position differing from that shown. For example, it may be placed on a side of the machine or within a seating space closed by a top, side or back door. What is important are only the connection systems of container 3 to the hydraulic circuit of machine 1, which shall be illustrated in greater detail with reference to FIGS. 3 to 5.

Figure 3:
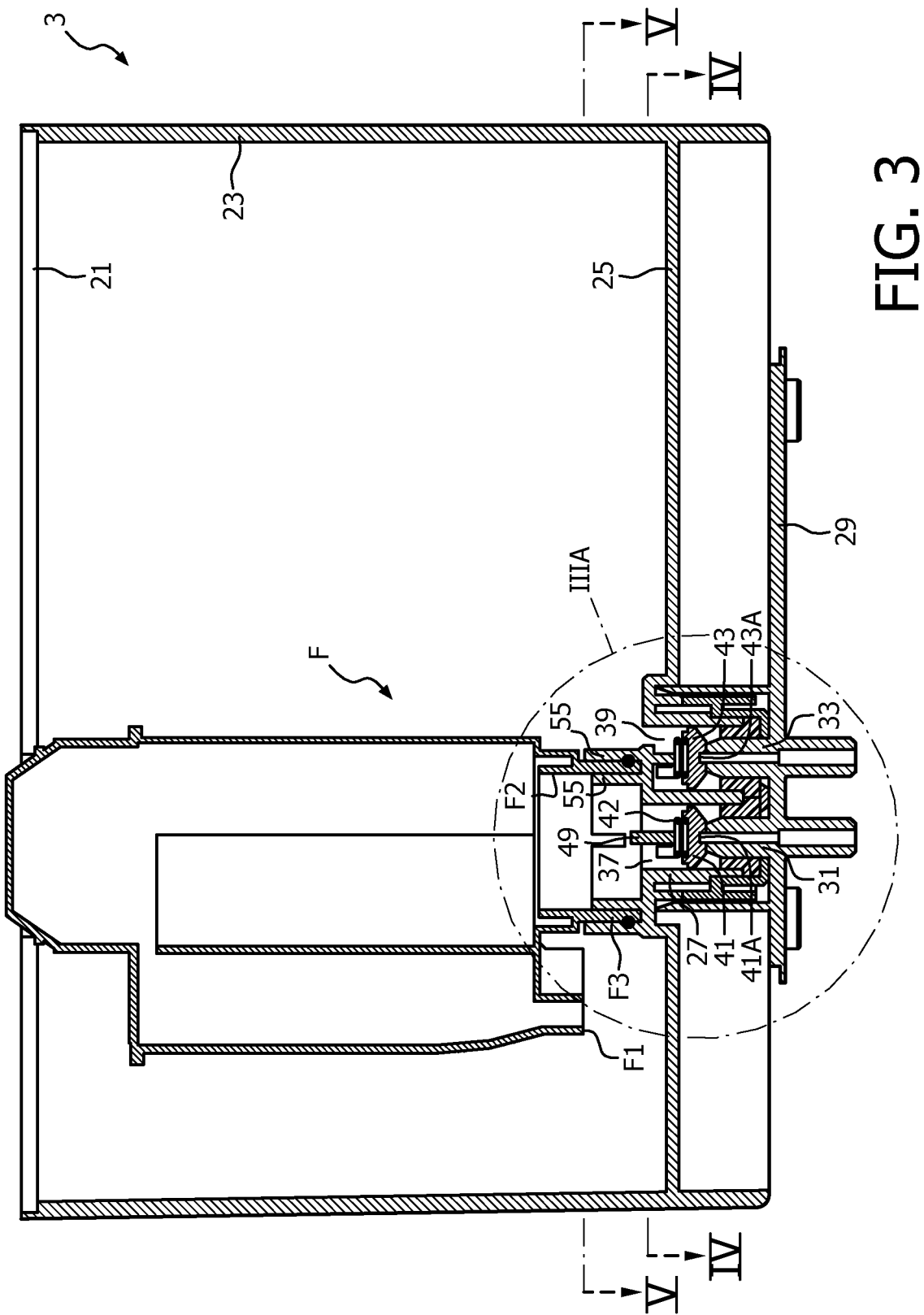
FIG. 3 shows a section according to a vertical plane of the water container with filter inserted.
Figure 3A:
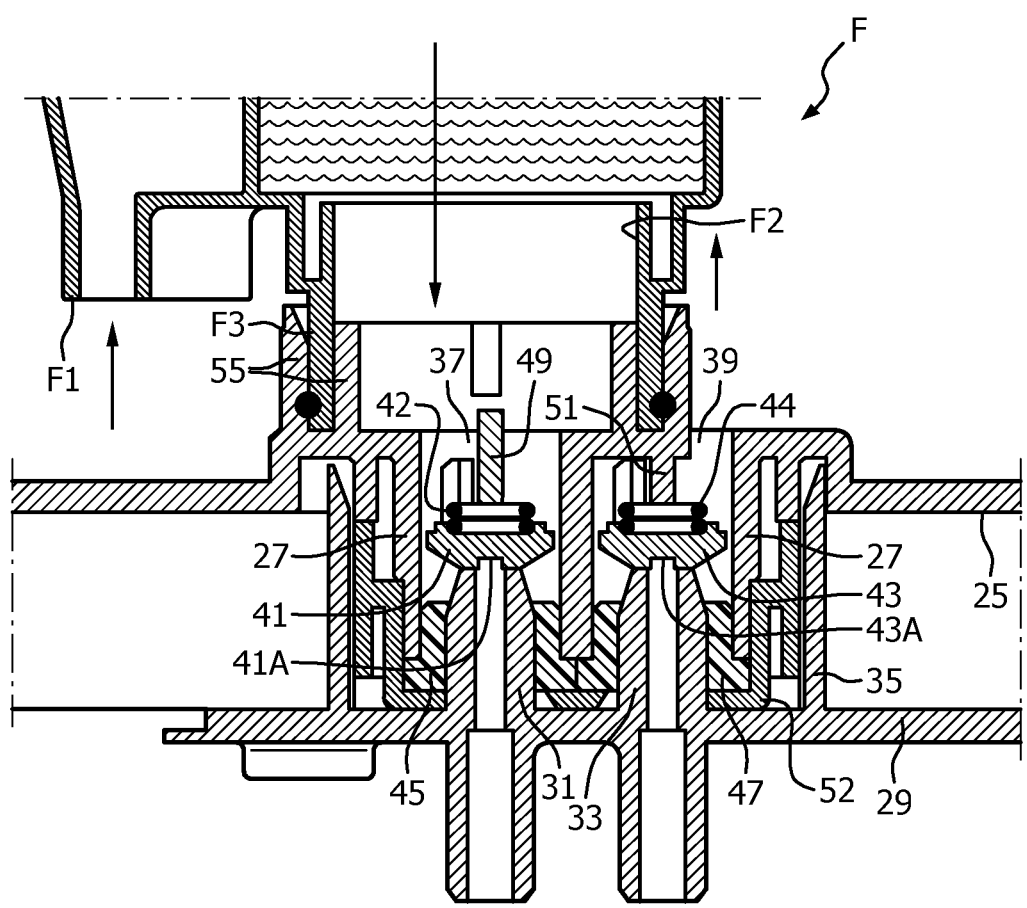
FIG. 3A shows an enlargement of FIG. 3.

In FIG. 3, the water container 3 is shown in a section according to a vertical plane. FIG. 3A shows an enlargement of the connecting zone of the container to the machine.

The container comprises: a top opening 21 that may be covered by a cover, not shown; side walls 23; and a bottom 25. A connecting union 27 to machine 1, of which FIG. 3 shows a wall or baffle 29, extends from the bottom surface of bottom 25, wherethrough connectors 31, 33 extend for the connection to the inside hydraulic circuit schematically shown in FIG. 2. In the practice, the baffle may be a part of a seat of the coffee machine 1 suitable for receiving the container. The connecting union 27 comprises a wall extending from bottom 25 of the container downwards, that is, towards the baffle or wall 29 of machine 1.

When container 3 is mounted on the machine, the connecting union 27 couples with a cylindrical wall 35 which develops from diaphragm 29 upwards, that is, towards container 3.

Advantageously, within union 27 there are defined two water apertures, respectively indicated with 37 and 39. As shall be better illustrated in detail hereinafter, aperture 37 is an outlet aperture, wherethrough water contained in container 3 is fed through the suction line of pump 7, whereas aperture 39 is an inlet aperture, wherethrough water or water/air mixture is reintroduced from the hydraulic circuit into container 3 during the priming step of pump 7.

A first closing valve is provided within the outlet aperture 37 whereas a second closing valve is provided within the inlet aperture 39.

In some embodiments, the first closing valve comprises a first shutter 41, whereas the second closing valve comprises a second shutter 43. Shutters 41 and 43 respectively cooperate with a first seal 45 and a second seal 47. Preferably, Shutters 41 and 43 are pushed against seals 45 and 47 by compression springs 42, 44 retained between shutters 41, 43 and components 49, 51 integral to bottom 25 of container 3. In this way, when container 3 is released from coffee machine 1, shutters 41 and 43 are pressed by the compression springs against seals 45 and 47 and close the outlet and inlet apertures 37 and 39 preventing the escape of water contained into container 3.

On the other hand, when container 3 is fit onto the coffee machine, connectors 31 and 33 insert into seals 45 and 47 and push shutters 41 and 43 upwards against the action of the compression springs 42, 44. Shutters 41 and 43 are provided with bottom grooves 41A, 43A so that in the raised position (shown in the section of FIG. 3 and in the enlargement of FIG. 3A) the water can flow through grooves 41A, 43A and connectors 31, 33.

In some embodiments, seals 45 and 47 are retained into position within the respective seats obtained into apertures 37 and 39 by means of a bottom closing cover 52 which may be screwed to the connecting union 27, or mounted jointwise or optionally welded to said connecting union 27.

When container 1 is mounted on the machine, the connecting union 27, formed by a substantially cylindrical or annular wall and completed by the closing cover 52, inserts within the substantially cylindrical wall 35 protruding from baffle 29 of the machine. In this way, a single union is made between container 3 and machine 1, which at the two inlet and outlet apertures 37 and 39 with the respective valves, defines two water passages. In this way, the fit of container 3 onto the machine is made very easy and reliable, thanks to the reciprocal closeness of the two apertures 37 and 39 and of the relevant opening and closing valves fitted with seals 45, 47 and gates 41, 43.

Within container 3, from bottom 25 thereof, a collar 55 develops which defines a joint-wise seat for a filter globally indicated with F. Filter F comprises an inlet F1 for the water and an outlet F2 for the water, so that when pump 7 sucks water from container 3, the latter flows through filter F entering through inlet F1 and travelling a first ascending portion and then a descending portion to come out through outlet F2. Outlet F2 is defined within a fitting sleeve F3 wherewith filter F is fitted and fixed onto the seat defined by collar 55. Collar 55 may be formed by an arrangement of two concentric walls forming an annular seat wherein the fitting sleeve F3 is inserted between the two concentric walls.

Within filter F there may be contained an ionic exchange resin bed for removing calcium from water.

The outlet aperture 37 is arranged within collar 55 and more exactly within the inside annular wall of the same collar so as to form a direct passage for water from outlet F2 to filter F up to connector 31 of the machine.

The inlet aperture 39 is in communication with the interior of container 3 as it is outside collar 55. In this way the water, air or water and air mixture coming from inside the machine enters through aperture 39 directly into the container without meeting any hindrance, thanks to the fact that the passage of aperture 39 is substantially lateral relative to the position of filter F. This ensures that any air bubbles do not remain trapped. As a consequence, the fluid flow that is reintroduced into container 3 in the priming step of pump 7 can freely flow into the container without the risk of forming air pockets.

It is understood that the drawing shows just one example, provided merely as a practical demonstration of the invention, which can vary in its forms and arrangements, without however departing from the scope of the concept underlying the invention. Any reference numbers in the appended claims are provided to facilitate reading of the claims with reference to the description and to the drawing, and do not limit the scope of protection represented by the claims.

The invention claimed is:

1. A water container for a machine for making beverages, the water container comprising:
   sidewalls;

a bottom;
a connecting union that connects the water container to the machine, wherein said connecting union comprises two apertures for water, said two apertures being an outlet aperture and an inlet aperture, wherein said inlet aperture comprises a first seat with a first seal and a first shutter sliding in the first seat, wherein said first seat protrudes from the bottom of the water container outwards, wherein the outlet aperture outputs filtered water, wherein the filtered water is recirculated into the water container through the inlet aperture, and wherein said connecting union further comprises a wall protruding from said bottom outwards of the water container and surrounding said two apertures;
a bottom closing cover coupled to said wall, wherein the water container is connected to the machine via the wall and the bottom closing cover; and
a collar that protrudes from said bottom inwards of the water container.

2. The water container according to claim 1, wherein said outlet aperture comprises a valve for closing the outlet aperture.

3. The water container according to claim 1, wherein said collar is formed by two concentric walls, said collar forming a seat for a filter sleeve of a water filter, wherein said outlet aperture is arranged within an inside wall of the two concentric walls of said collar, and wherein said inlet aperture is in communication with said water container outside said collar.

4. The water container according to claim 1, wherein said outlet aperture comprises a second seat with a second seal and a second shutter sliding in the second seat, said second seat protruding from the bottom of the water container outwards, and said each seat being surrounded by said wall of the connecting union protruding from the bottom of the water container.

5. The water container according to claim 4, wherein said bottom closing cover locks said seals.

6. The water container according to claim 1, further comprising a water filter, wherein the water filter comprises:
a filter inlet for inletting water, from the water container, into the water filter for filtration;
a filter outlet surrounded by a filter sleeve of the water filter for outputting water from the water filter into the outlet aperture;
an ascending filter portion in direct communication with the filter inlet; and
a descending filter portion in direct communication with the filter outlet,
wherein the water entering the filter inlet is configured to travel up the ascending filter portion and into the descending filter portion, the water entering the filter inlet being configured to travel down in the descending filter portion to exit through the filter outlet.

7. The water container according to claim 1, wherein the outlet aperture and the inlet aperture are connected to each other around a center of the connecting union.

8. The water container according to claim 1, further comprising a water filter, wherein the water filter comprises a filter inlet for inletting water, from the water container, into the water filter for filtration, wherein the filter inlet is arranged on a first side of the collar, wherein the inlet aperture is arranged on a second side of the collar, and wherein the first side and the second side are opposite to each other.

9. A machine for making beverages, the machine comprising:

a container comprising:
side walls;
a bottom;
a connecting union, said connecting union connecting the container to the machine; and
a bottom closing cover; and
a hydraulic circuit connected to the container,
wherein the connecting union of the container comprises two apertures for water, said two apertures being an outlet aperture and an inlet aperture, wherein said inlet aperture comprises a first seat with a first seal and a first shutter sliding in the first seat, wherein said first seat protrudes from the bottom of the container outwards, wherein the outlet aperture outputs filtered water, wherein the filtered water is recirculated into the container through the inlet aperture, wherein said connecting union further comprises a wall protruding from said bottom outwards of the container and surrounding said two apertures,
wherein the bottom closing cover is coupled to said wall, wherein the container is connected to the machine via the wall and the bottom closing cover, and
wherein the bottom of the container comprises a collar protruding from said bottom inwards of the container.

10. The machine according to claim 9, further comprising a baffle defining a support for the container, wherefrom a wall with an annular development cooperating with said connecting union develops towards the container.

11. The machine according to claim 10, wherein said wall with the annular development has a substantially cylindrical development.

12. The machine according to claim 10, wherein said wall with the annular development comprises two connectors inside said wall, which cooperates with said two apertures, respectively.

13. A water container for a machine for making beverages, the water container comprising:
sidewalls;
a bottom;
a connecting union that connects the water container to the machine, wherein said connecting union comprises two apertures for water, said two apertures being an outlet aperture and an inlet aperture, wherein said inlet aperture comprises a first seat with a first seal and a first shutter sliding in the first seat, wherein said first seat protrudes from the bottom of the water container outwards, wherein the outlet aperture outputs filtered water, wherein the filtered water is recirculated into the water container through the inlet aperture, and wherein said connecting union further comprises a wall protruding from said bottom outwards of the water container and surrounding said two apertures;
a bottom closing cover coupled to said wall, wherein the water container is connected to the machine via the wall and the bottom closing cover; and
a filter seat for a water filter having a filter sleeve, wherein said filter seat is formed by a collar.

14. The water container according to claim 13, wherein said collar protrudes from said bottom inwards of the water container.

15. The water container according to claim 13, wherein said outlet aperture comprises a second seat with a second seal and a second shutter sliding in the second seat, said second seat protruding from the bottom of the water container outwards, and said each seat being surrounded by said wall of the connecting union protruding from the bottom of the water container.

16. The water container according to claim 15, wherein said bottom closing cover locks said seals.

* * * * *